US010044559B2

(12) United States Patent
Linsky et al.

(10) Patent No.: US 10,044,559 B2
(45) Date of Patent: Aug. 7, 2018

(54) SYSTEMS AND METHODS FOR PROVISIONING DEVICES

(71) Applicant: QUALCOMM Incorporated, San Diego, CA (US)

(72) Inventors: Joel Benjamin Linsky, San Diego, CA (US); Stephen Alton Sprigg, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 99 days.

(21) Appl. No.: 15/261,544

(22) Filed: Sep. 9, 2016

(65) Prior Publication Data
US 2017/0214573 A1    Jul. 27, 2017

Related U.S. Application Data

(60) Provisional application No. 62/286,078, filed on Jan. 22, 2016.

(51) Int. Cl.
*H04L 12/26* (2006.01)
*H04L 12/24* (2006.01)
*H04W 48/08* (2009.01)
*H04W 48/16* (2009.01)
*H04W 4/70* (2018.01)
*H04W 4/50* (2018.01)
*H04L 12/12* (2006.01)

(52) U.S. Cl.
CPC ........... *H04L 41/0806* (2013.01); *H04W 4/50* (2018.02); *H04W 4/70* (2018.02); *H04W 48/08* (2013.01); *H04W 48/16* (2013.01); *H04L 12/12* (2013.01)

(58) Field of Classification Search
CPC ... G06F 1/3203; H04L 12/12; H04L 41/0806; H04W 28/02; H04W 28/08; H04W 48/08; H04W 4/50; H04W 4/70; H04W 48/16
USPC ................. 370/311, 328, 329, 466, 252, 254
See application file for complete search history.

(56) References Cited

U.S. PATENT DOCUMENTS

| 7,463,596 | B2 | 12/2008 | Roskind et al. |
| 9,020,769 | B2 | 4/2015 | Rada et al. |
| 2006/0198335 | A1* | 9/2006 | Reunamaki ............. H04L 12/12 370/328 |

(Continued)

OTHER PUBLICATIONS

Chen Z., et al., "Toward the Internet of Things Application and Management: A Practical Approach", Proceeding of IEEE International Symposium on a World of Wireless, Mobile and Multimedia Networks, 2014, IEEE, Jun. 19, 2014, XP032656325, pp. 1-6.

(Continued)

*Primary Examiner* — Harun Chowdhury
(74) *Attorney, Agent, or Firm* — Norton Rose Fullbright LLP

(57) ABSTRACT

Systems and methods for provisioning devices to access a wireless communication network are described. This provisioning is based upon a correlation between a first time value when operating power is applied to a first device, and a second time value when operating power is applied to a second device. These two time values may be compared using messaging between the two devices, and provisioning information may be transmitted from one device to another based upon an observed correlation between the two time values.

31 Claims, 9 Drawing Sheets

(56) References Cited

U.S. PATENT DOCUMENTS

| | | |
|---|---|---|
| 2010/0241880 A1* | 9/2010 | Wertheimer .......... G06F 1/3203 |
| | | 713/310 |
| 2013/0081113 A1 | 3/2013 | Cherian et al. |
| 2013/0223279 A1 | 8/2013 | Tinnakornsrisuphap et al. |
| 2013/0241697 A1 | 9/2013 | Baumert et al. |
| 2013/0272182 A1* | 10/2013 | Li ........................ H04W 28/02 |
| | | 370/311 |
| 2014/0028818 A1 | 1/2014 | Brockway, III et al. |
| 2014/0244768 A1 | 8/2014 | Shuman et al. |
| 2015/0048162 A1* | 2/2015 | Jonsson ............. H05B 37/0245 |
| | | 235/385 |
| 2015/0061859 A1 | 3/2015 | Matsuoka et al. |
| 2015/0317467 A1 | 11/2015 | Rattner et al. |

OTHER PUBLICATIONS

International Search Report and Written Opinion—PCT/US2016/062823—ISA/EPO—dated Feb. 3, 2017.
Muhtadi J. A., et al., "Secure Smart Homes using Jini and UIUC SESAME", Computer Security Applications, 2000, ACSAC, 00, 16th Annual Conference New Orleans, LA, USA Dec. 11-15, 2000, Los Alamitos, CA, USA, IEEE Comput. Soc, US, Dec. 11, 2000, XP919529893, pp. 77-85.

* cited by examiner

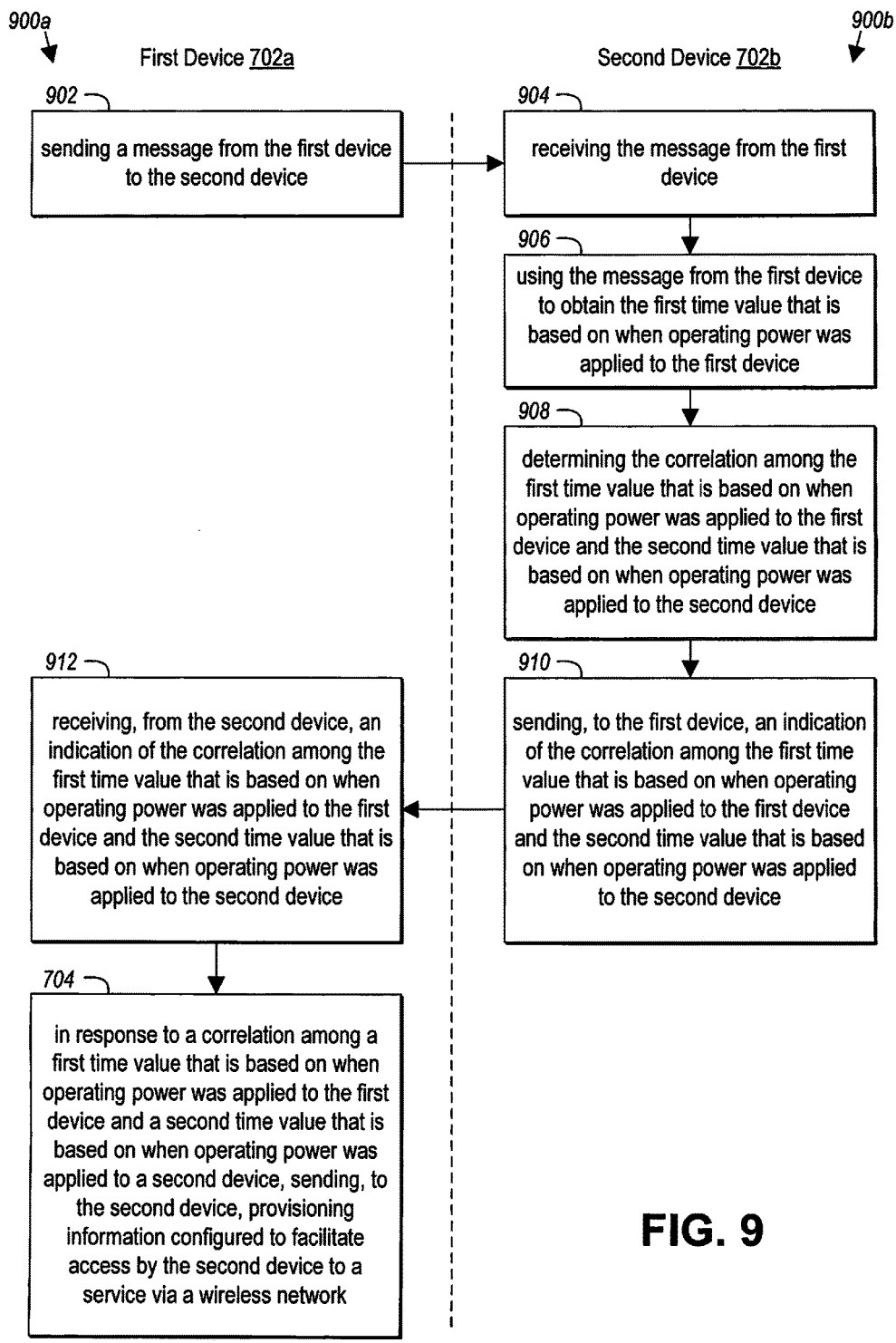

SYSTEMS AND METHODS FOR PROVISIONING DEVICES

CROSS-REFERENCE TO RELATED APPLICATIONS

This application claims the benefit of U.S. Provisional Patent Application No. 62/286,078, entitled, "COINCIDENT POWER-ON PROVISIONING FOR ACCESS TO A WIRELESS COMMUNICATION NETWORK, filed on Jan. 22, 2016, which is expressly incorporated by reference herein in its entirety.

BACKGROUND

Field of the Disclosure

The described technology generally relates to provisioning of devices for accessing a wireless communication network. More specifically, the disclosure is directed to devices, systems, and methods related to using correlated power-on times of devices to provision a device to access a wireless communication network with decreased user interaction.

Description of Related Art

In order to add a device to a wireless communication network, a user may need to provide the device with information regarding the wireless communication network. For example, the device may need to be provisioned with a service set identifier, a password, or other information about the wireless communication network before it can use the network. Connected home devices are becoming more common, in which a number of different devices in a home may be provided with network access. Other devices may also need to be provisioned for wireless communication network access as well.

As consumers add more and more devices to their homes, including connected home devices, the time to provision all of these devices becomes burdensome. For example, today, provisioning one connected light bulb to your network can take several minutes. In a case where a consumer is adding multiple light bulbs at the same time, or even just later replacing a single light bulb later, this provisioning time may become prohibitive. Consequently, there is an ongoing need to more efficiently provision new devices for wireless communication network access.

SUMMARY

The implementations disclosed herein each have several innovative aspects, no single one of which is solely responsible for the desirable attributes of the invention. Without limiting the scope, as expressed by the claims that follow, the more prominent features will be briefly disclosed here. After considering this discussion, one will understand how the features of the various implementations provide several advantages over current wireless charging systems.

In one aspect, a method for provisioning is described. The method includes by a first device, in response to a correlation among a first time value that is based on when operating power was applied to the first device and a second time value that is based on when operating power was applied to a second device, sending, to the second device, provisioning information configured to facilitate access by the second device to a service via a wireless network.

The method may further include, by the first device, receiving a message from the second device, using the message from the second device to obtain the second time value that is based on when operating power was applied to the second device, and determining the correlation among the first time value that is based on when operating power was applied to the first device and the second time value that is based on when operating power was applied to the second device, where in response to the correlation among the first time value that is based on when operating power was applied to the first device and the second time value that is based on when operating power was applied to the second device, sending, to the second device, provisioning information configured to facilitate access by the second device to the service via the wireless network includes by the first device, in response to determining the correlation among the first time value that is based on when operating power was applied to the first device and the second time value that is based on when operating power was applied to the second device, sending, to the second device, the provisioning information configured to facilitate access by the second device to the service via the wireless network.

The method may further include, by the first device, sending a message from the first device to the second device, wherein the second device is configured to receive the message from the first device, use the message from the first device to obtain the first time value that is based on when operating power was applied to the first device, determine the correlation among the first time value that is based on when operating power was applied to the first device and the second time value that is based on when operating power was applied to the second device, and send, to the first device, an indication of the correlation among the first time value that is based on when operating power was applied to the first device and the second time value that is based on when operating power was applied to the second device. The method may further include, by the first device, receiving, from the second device, the indication of the correlation among the first time value that is based on when operating power was applied to the first device and the second time value that is based on when operating power was applied to the second device, where in response to the correlation among the first time value that is based on when operating power was applied to the first device and the second time value that is based on when operating power was applied to the second device, sending, to the second device, provisioning information configured to facilitate access by the second device to the service via the wireless network including, by the first device, in response to receiving, from the second device, the indication of the correlation among the first time value that is based on when operating power was applied to the first device and the second time value that is based on when operating power was applied to the second device, sending, to the second device, the provisioning information configured to facilitate access by the second device to the service via the wireless network.

In one aspect, a method for provisioning is disclosed, including, by a wireless device, receiving from a first device provisioning information configured to facilitate access by the wireless device to a service via a wireless network, the provisioning information sent by the first device in response to a correlation among a first time value that is based on when operating power was applied to the first device and a second time value that is based on when operating power was applied to the wireless device, and, by the wireless device, using the received provisioning information, which was sent by the first device in response to the correlation among the first time value that is based on when operating power was applied to the first device and the second time value that is based on when operating power was applied to the wireless device, to access the service via the wireless network.

The method may further include, by the wireless device, sending a message from the wireless device to the first device, wherein the first device is configured to receive the message from the wireless device, use the message from the wireless device to obtain the second time value that is based on when operating power was applied to the wireless device, determine the correlation among the first time value that is based on when operating power was applied to the first device and the second time value that is based on when operating power was applied to the wireless device, and, in response to determining the correlation among the first time value that is based on when operating power was applied to the first device and the second time value that is based on when operating power was applied to the wireless device, send, to the wireless device, the provisioning information configured to facilitate access by the wireless device to the service via the wireless network.

The method may further include, by the wireless device, receiving a message from the first device, using the message from the first device to obtain the first time value that is based on when operating power was applied to the first device, determining the correlation among the first time value that is based on when operating power was applied to the first device and the second time value that is based on when operating power was applied to the wireless device, and sending, to the first device, an indication of the correlation among the first time value that is based on when operating power was applied to the first device and the second time value that is based on when operating power was applied to the wireless device, wherein the first device is configured to receive, from the wireless device, the indication of the correlation among the first time value that is based on when operating power was applied to the first device and the second time value that is based on when operating power was applied to the wireless device and, in response to receiving, from the wireless device, the indication of the correlation among the first time value that is based on when operating power was applied to the first device and the second time value that is based on when operating power was applied to the wireless device, send, to the wireless device, the provisioning information configured to facilitate access by the wireless device to the service via the wireless network.

In one aspect, an apparatus for provisioning is described. The apparatus includes a first device including a processor configured with processor-executable instructions to perform operations including, in response to a correlation among a first time value that is based on when operating power was applied to the first device and a second time value that is based on when operating power was applied to a second device, sending, to the second device, provisioning information configured to facilitate access by the second device to a service via a wireless network.

The processor may be configured with processor-executable instructions to perform operations further including determining the correlation among the first time value that is based on when operating power was applied to the first device and the second time value that is based on when operating power was applied to the second device.

The processor may be configured with processor-executable instructions to perform operations such that, in response to the correlation among the first time value that is based on when operating power was applied to the first device and the second time value that is based on when operating power was applied to the second device, sending, to the second device, the provisioning information configured to facilitate access by the second device to the service via the wireless network includes, in response to determining the correlation among the first time value that is based on when operating power was applied to the first device and the second time value that is based on when operating power was applied to the second device, sending, to the second device, the provisioning information configured to facilitate access by the second device to the service via the wireless network.

The processor may be configured with processor-executable instructions to perform operations further including receiving a message from the second device, and using the message from the second device to obtain the second time value that is based on when operating power was applied to the second device.

The message from the second device may be broadcast by the second device in response to the operating power that was applied to the second device.

The processor may be configured with processor-executable instructions to perform operations further including broadcasting a first message in response to the operating power that was applied to the first device, where the second device sent, in response to receiving the first message, the message from the second device.

The processor may be configured with processor-executable instructions to perform operations such that using the message from the second device to obtain the second time value including generating the second time value from a time when the first device received the message from the second device.

The message from the second device may include the second time value that is based on when operating power was applied to the second device.

The second time value, which is included in the message from the second device and which is based on when operating power was applied to the second device, may be a time value indicating when the second device sent the message.

The second time value, which is included in the message from the second device and which is based on when operating power was applied to the second device, may be a time value indicating when operating power was applied to the second device.

The processor may be configured with processor-executable instructions to perform operations further including receiving, from the second device, an indication of the correlation among the first time value that is based on when operating power was applied to the first device and the second time value that is based on when operating power was applied to the second device.

The processor may be configured with processor-executable instructions to perform operations such that in response to the correlation among the first time value that is based on when operating power was applied to the first device and the second time value that is based on when operating power was applied to the second device, sending, to the second device, the provisioning information configured to facilitate access by the second device to the service via the wireless network includes, by the first device, in response to receiving, from the second device, the indication of the correlation among the first time value that is based on when operating power was applied to the first device and the second time value that is based on when operating power was applied to the second device, sending, to the second device, the provisioning information configured to facilitate access by the second device to the service via the wireless network.

The processor may be configured with processor-executable instructions to perform operations further including sending a message from the first device to the second device, wherein the second device is configured to use the message from the first device to obtain the first time value that is based on when operating power was applied to the first device.

The processor may be configured with processor-executable instructions to perform operations such that sending the message from the first device to the second device comprises broadcasting the message from the first device in response to the operating power that was applied to the first device.

The processor may be configured with processor-executable instructions to perform operations further including receiving a first message from the second device, wherein sending the message from the first device to the second device comprises sending the message from the first device in response to receiving the first message from the second device.

The second device may be configured to use the message from the first device to obtain the first time value by generating the second time value from a time when the second device received the message from the first device.

The message from the first device may include the first time value.

The first time value included in the message from the first device may be a time value indicating when the first device sent the message.

The first time value included in the message from the first device may be a time value indicating when operating power was applied to the first device.

The provisioning information, which is sent to the second device in response to the correlation among the first time value that is based on when operating power was applied to the first device and the second time value that is based on when operating power was applied to the second device, may include at least one of a credential for the wireless network, a credential for the service, or a cryptographic key.

In one aspect, A wireless device is described, including a processor configured with processor-executable instructions to perform operations including receiving from a first device provisioning information configured to facilitate access by the wireless device to a service via a wireless network, the provisioning information sent by the first device in response to a correlation among a first time value that is based on when operating power was applied to the first device and a second time value that is based on when operating power was applied to the wireless device, and using the received provisioning information, which was sent by the first device in response to the correlation among the first time value that is based on when operating power was applied to the first device and the second time value that is based on when operating power was applied to the wireless device, to access the service via the wireless network.

The processor may be configured with processor-executable instructions to perform operations further comprising sending a message from the wireless device to the first device, wherein the first device is configured to receive the message from the wireless device, use the message from the wireless device to obtain the second time value that is based on when operating power was applied to the wireless device, determine the correlation among the first time value that is based on when operating power was applied to the first device and the second time value that is based on when operating power was applied to the wireless device, and, in response to determining the correlation among the first time value that is based on when operating power was applied to the first device and the second time value that is based on when operating power was applied to the wireless device, send, to the wireless device, the provisioning information configured to facilitate access by the wireless device to the service via the wireless network.

The processor may be configured with processor-executable instructions to perform operations further including receiving a message from the first device, using the message from the first device to obtain the first time value that is based on when operating power was applied to the first device, determining the correlation among the first time value that is based on when operating power was applied to the first device and the second time value that is based on when operating power was applied to the wireless device, and sending, to the first device, an indication of the correlation among the first time value that is based on when operating power was applied to the first device and the second time value that is based on when operating power was applied to the wireless device, wherein the first device is configured to receive, from the wireless device, the indication of the correlation among the first time value that is based on when operating power was applied to the first device and the second time value that is based on when operating power was applied to the wireless device, and in response to receiving, from the wireless device, the indication of the correlation among the first time value that is based on when operating power was applied to the first device and the second time value that is based on when operating power was applied to the wireless device, send, to the wireless device, the provisioning information configured to facilitate access by the wireless device to the service via the wireless network.

The provisioning information, which is sent to the wireless device in response to the correlation among the first time value that is based on when operating power was applied to the first device and the second time value that is based on when operating power was applied to the wireless device, may include at least one of a credential for the wireless network, a credential for the service, or a cryptographic key.

The following detailed description together with the accompanying drawings will provide a better understanding of the nature and advantages of the present invention.

BRIEF DESCRIPTION OF THE DRAWINGS

The above-mentioned aspects, as well as other features, aspects, and advantages of the present technology will now be described in connection with various implementations, with reference to the accompanying drawings. The illustrated implementations, however, are merely examples and are not intended to be limiting. Throughout the drawings, similar symbols typically identify similar components, unless context dictates otherwise. Note that the relative dimensions of the following figures may not be drawn to scale.

FIG. 9 illustrates exemplary methods for provisioning, according to some aspects of the present disclosure.

DETAILED DESCRIPTION

Figure 1:
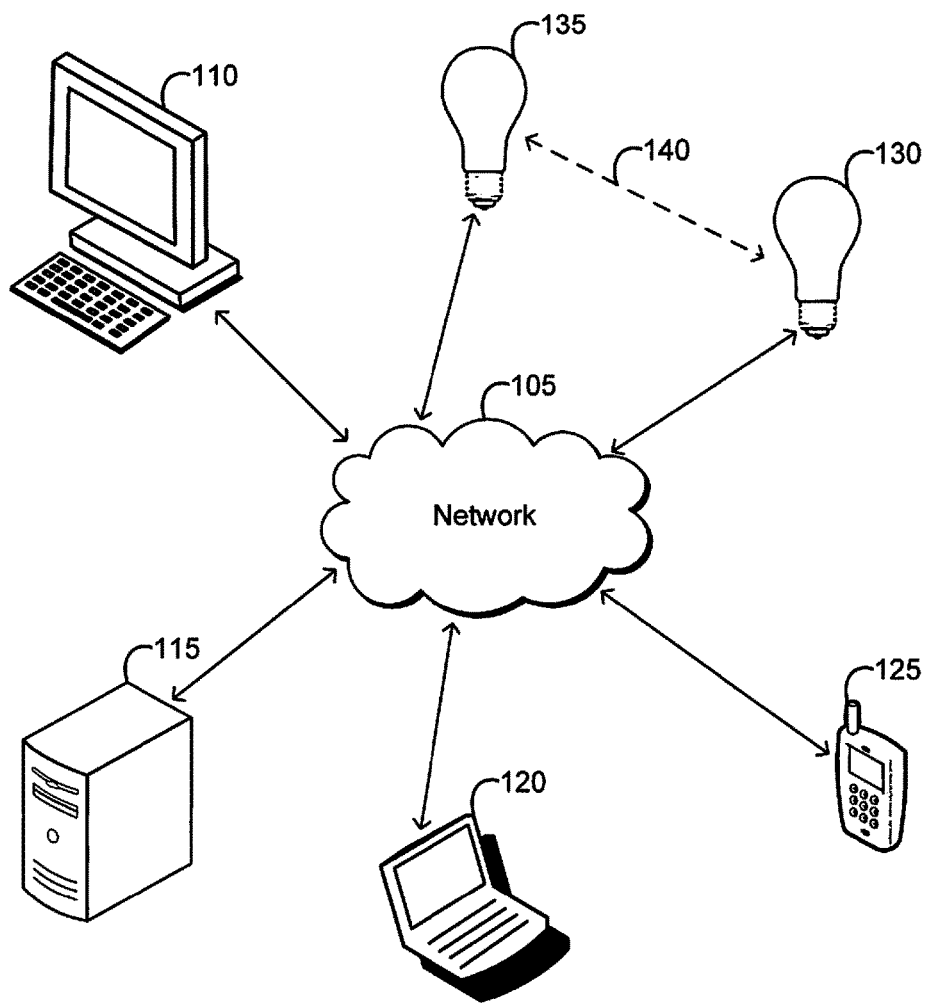
FIG. 1 is an illustration of a wireless communication network according to some aspects of the present disclosure.

In the following detailed description, reference is made to the accompanying drawings, which form a part of the present disclosure. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and form part of this disclosure.

Many devices may be configured to access a wireless communication network. A wireless communication network may include a network that operates according to the principles of an IEEE 802.11 standard (a Wi-Fi network), a cellular network according to various 3G, 4G, and other standards, a Bluetooth network, or another wireless communication network.

In order to access such a wireless communication network, a device may need to be provisioned with provisioning information regarding the wireless communication network. This provisioning information may include, among other things, a name of the network, a password for the network, a type of encryption used on the network, or other information. For example, in order to access a Wi-Fi network, a device may need to be provisioned with a service set identifier (SSID) of the network, and security information for the network, such as a password and a type of encryption used on the network. Provisioning may also include, for example, providing a file to a device which may allow the device to be uniquely identified on the network, in order to increase enterprise network security. Various types of information may be provided to a device in order to provision the device for a given wireless communication network, based on the needs and requirement of that network.

Network-connected devices are increasing in popularity, and so a user may own a larger number of connected devices than ever before. For example, connected home devices, such as smart light bulbs, smart appliances, and other smart devices or electric devices, may connect to a user's wireless communication network (such as a Wi-Fi network), and may provide a user with a number of features that are enabled based upon this connection. In order for each of these devices to connect to the wireless communication network, those devices may each need to be provisioned for the network. One way to provision these devices may be to allow a user to individually provision each device, at the time when the device first wishes to access a wireless communication network. However, this may be somewhat inefficient when a user is adding a number of smart devices, such as smart light bulbs to a house, to a network at a particular time. This approach may also be burdensome if it requires that a user provision each new device as they are added, such as when a smart light bulb is changed. Accordingly, it may be desired to provide a more efficient manner of provisioning devices to access a wireless communication network.

Multiple devices on a wireless communication network, such as devices in a connected home environment, may share a number of similar traits. For example, a smart light bulb in a connected home may be located geographically near other smart light bulbs or connected devices in the same connected home. Other traits may also be shared by devices in a connected home or other environment. For example, a number of different connected devices may be turned on or off by a single switch, such as a number of smart light bulbs that may be turned on or off by a single light switch, or which may be connected to the same circuit within a home or other environment. Thus, these devices may turn on or off at the same time, or at very similar times. Devices may also share other similar traits, or have other correlated events. For example, devices which are close in proximity to one another may be in similar environments, such that they observe other phenomenon at similar times, such as lighting changes, temperature changes, or sounds. For example, two cameras in the same environment may observe that the lights in a room come on at the same time.

Smart devices may be configured to be provisioned, or to provision one another, for a wireless communication network based on these similar environmental characteristics between the devices. For example, smart devices may be configured to provision one another based on these correlated environmental characteristics between the devices. Such provisioning may be done with less user interaction that might otherwise be required to provision a new device. In some aspects, a user may not be required to interact with the devices at all in order to provision a new device. A user may also merely be required to confirm that a new device was added in order to provision the new device, rather than manually provide the device with wireless communication network provisioning information.

It may be desirable to allow new devices to obtain provisioning information from existing devices with reduced user interaction. This provisioning information may be transmitted to new devices based on correlations between new devices and existing devices. For example, in a connected home, devices may be turned on at the same time, such as multiple smart light bulbs connected to a single light switch or circuit. When a new connected device is added to this switch, it may be provisioned by existing devices in the connected home based on environmental correlations, such as when the new device turns on, relative to when other devices in the connected home are turned on. For example, an existing device may provide provisioning information to a new device based upon an observation of a correlation between the times that the two devices received operating power. Specific examples will now be described with reference to the figures.

FIG. 1 is an illustration of a wireless communication network according to some aspects of the present disclosure. As illustrated, a number of different devices, such as electric devices, may be connected to a network 105. Network 105 may be a wireless communication network, for example, a wireless communication network operating according to the IEEE 802.11 standards, as a Wi-Fi network. Network 105 may offer a connection to a wider network as well, such as to the Internet. In some aspects, network 105 may represent a particular service or set of services offered on a larger network, such as a smart home service which might be offered using a Wi-Fi network or over the Internet.

As illustrated, a variety of devices may connect to network 105. For example, computers 110, 115 may connect to network 105, as well as laptop computers 120 or tablet devices, as well as smart phones 125. Further, a number of connected home devices 130, 135 may connect to network 105. These connected home devices may include light bulbs, a refrigerator, appliances of various sorts, and other devices. Such a connected home may be useful for a variety of purposes, such as remote monitoring and control, as well as the ability to automatically order replacement products, and for other reasons. In order to access network 105, each device may need to be provided with certain provisioning information. For example, network 105 may have a name (such as a service set identifier), and may require certain security credentials, such as a password and a type of encryption or security that might be used on network 105. In order to access network 105, a device may need to know some or all of this information. Such information may generally be referred to as provisioning information. This provisioning information may also include information on how to access a particular service on the network, such as a connected home service or another service (for instance, services remotely managed via an account such as a Google.com account, an Amazon.com account, a Facebook.com account, an ADT™ home security account, or other services).

Generally, for connected home devices, such as home devices 130, 135, it may be desirable to allow such devices to be provisioned in a more automated fashion. Many of these devices, such as a connected light bulb, may lack a user interface. Accordingly, more automated methods of provisioning such devices may be useful. As illustrated in FIG. 1, connected home devices 130, 135 may be configured to communicate with the network as a whole, but may also be configured to communicate 140 directly with one another. In some aspects, this communication 140 may include peer-to-peer (P2P) networking or ad-hoc networking or other suitable networking. This communication 140 directly between connected home devices 130, 135 may be used in order to allow those devices 130, 135 to provide each other with provisioning information to access the network 105, which might include a Wi-Fi network, the Internet, and/or services offered using such a local-area or wide-area network.

Figure 2:
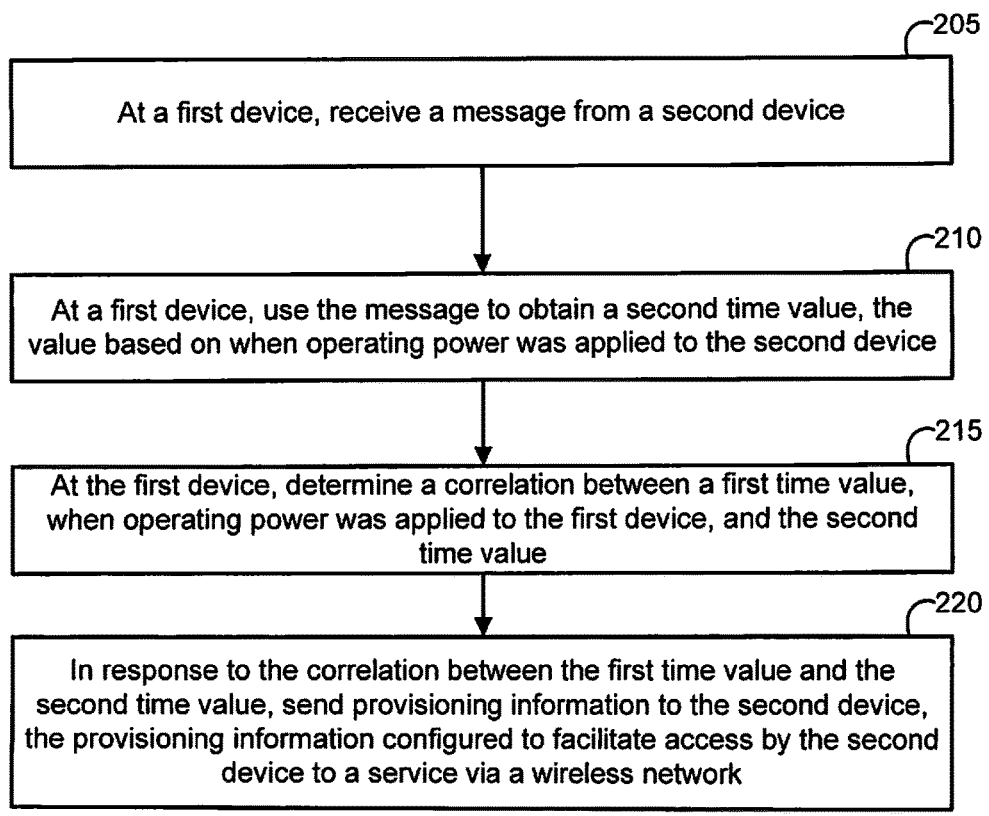
FIG. 2 is an illustration of a method of provisioning a device according to some aspects of the present disclosure.

FIG. 2 is an illustration of a method of provisioning a device according to some aspects of the present disclosure. Here, this method may be used to provision an unprovisioned device that is on the same power switch as another device which is already provisioned, such as when two smart light bulbs may be on the same light switch. The method may also be used to provision devices that are not on the same switch, but which may be turned on or off, such as by a user, at the same time. This method is merely exemplary, and certain portions of the illustrated method may be omitted, such as certain authentication steps. In some aspects, this method may be carried out on a provisioned device on a wireless communication network that is configured to provide provisioning information to other devices.

At block 205, a first device receives a message from a second device. For example, the first device may be a smart device such as a smart light bulb that is configured to access a service via the wireless network, and the second device may also be a smart device such as a smart light bulb. The second device may not yet be configured with provisioning information in order to access the wireless network, such as a Wi-Fi network. The first device may be configured to access the wireless network, and may also be configured to provide provisioning information to other devices to access the wireless network.

The first message may be a message transmitted by the second device to the first device, requesting provisioning information from the wireless network. In some aspects, the first device may use a receiver to receive the message, which may be a message transmitted over a wireless medium in a packet. The message may be a broadcast message to all nearby devices, such as on a channel where other devices may listen for such messages.

At block 210, the first device uses the message to obtain a second time value, the second time value based on when operating power was applied to the second device. For example, the second device may be configured to record the time at which it receives operating power, and to transmit that time to the first device. The second device may transmit this time in response to a message from the first device, such as a message indicating that the first device can provision other devices. The second device may be configured to transmit a message indicating the time it received operating power every time it is powered on when it is not provisioned. In some aspects, the message from the second device may include a counter value, such as a value indicating when the second device received operating power. Such a time value may be based on when a device received operating power. For example, this time value may be the time at which the device received operating power. The time value may also be the result of operating power being applied to the device, but not actually be the time the device received operating power. For example, a device may be configured to initiate a startup routine when operating power is applied to the device. The time value may be generated as a step in such a routine, and may correspond to a time at which that portion of the routine was executed, for example. Accordingly, the time value may not be the time the device received operating power, but instead a time at which the device reached a certain stage of its startup routine or other instructions.

The second time value may also be inferred from when the message was received. For example, the second device may be configured to transmit a message seeking provisioning information at a specific duration after it was powered on. For example, if the second device is configured to transmit a message one second after it is turned on, then the second time value may be inferred based upon when the message was transmitted or based on when the message was received by the first device. The time value may be based upon the time of the delivery of the message, the message receipt time, or another time. Any of these times may be based upon when operating power was applied to the device.

At block 215, the first device determines a correlation between the second time value and a first time value, the first time value based on when operating power was applied to the first device. The first device may be aware of a time at which it receives operating power. For example, the first device may record a first time value when it receives operating power or the first device may start a counter when it first receives operating power. The first device may then be aware of the first time value, and may be configured to compare the first time value to the second time value. For example, the correlation between these two times may include a difference between the first time value and the second time value. For example, this difference may be measured in seconds, milliseconds, in clock cycles, or in another unit. In some aspects, the means for determining a correlation may be a processor.

In some cases, either the provisioned device or the unprovisioned device may be used to determine a correlation between the two devices. As described here, the provisioned device determines the correlation, but in other cases, a wireless unprovisioned device determines this correlation between the two devices.

At block 220, in response to the correlation between the first time value and the second time value, the first device sends provisioning information to the second device, the provisioning information configured to facilitate access by the second device to a service via a wireless network. For example, if the first device finds that the two time values are similar enough, the first device may be configured to transmit provisioning information to the second device. In some aspects, the similarity between the first time value and the second time value may be a very short time window, such as 1 millisecond, 5 milliseconds, 10 milliseconds, or 100 milliseconds, or another time window. That is, provisioning information may be provided to the second device by the first device if the two devices receive operating power at times which are quite similar, or times which are highly correlated. In some aspects, the provisioning information may be transmitted by the first device, such as using a transmitter. This information may be encrypted, in order to provide security for the network access information.

User interaction may also be needed to provide this provisioning information. For example, the first device may request permission from a user prior to provisioning another device for wireless network access. A user may be told, for example, that a new device was turned on at the same time as the first device, and asked if the user installed a new device. A user may also be able to turn on or off a setting on the first device, to allow it to automatically provision new devices based on correlations, or to turn off this feature, or to request that the user authorize each new device that is provisioned, prior to that device being provisioned.

Figure 3:
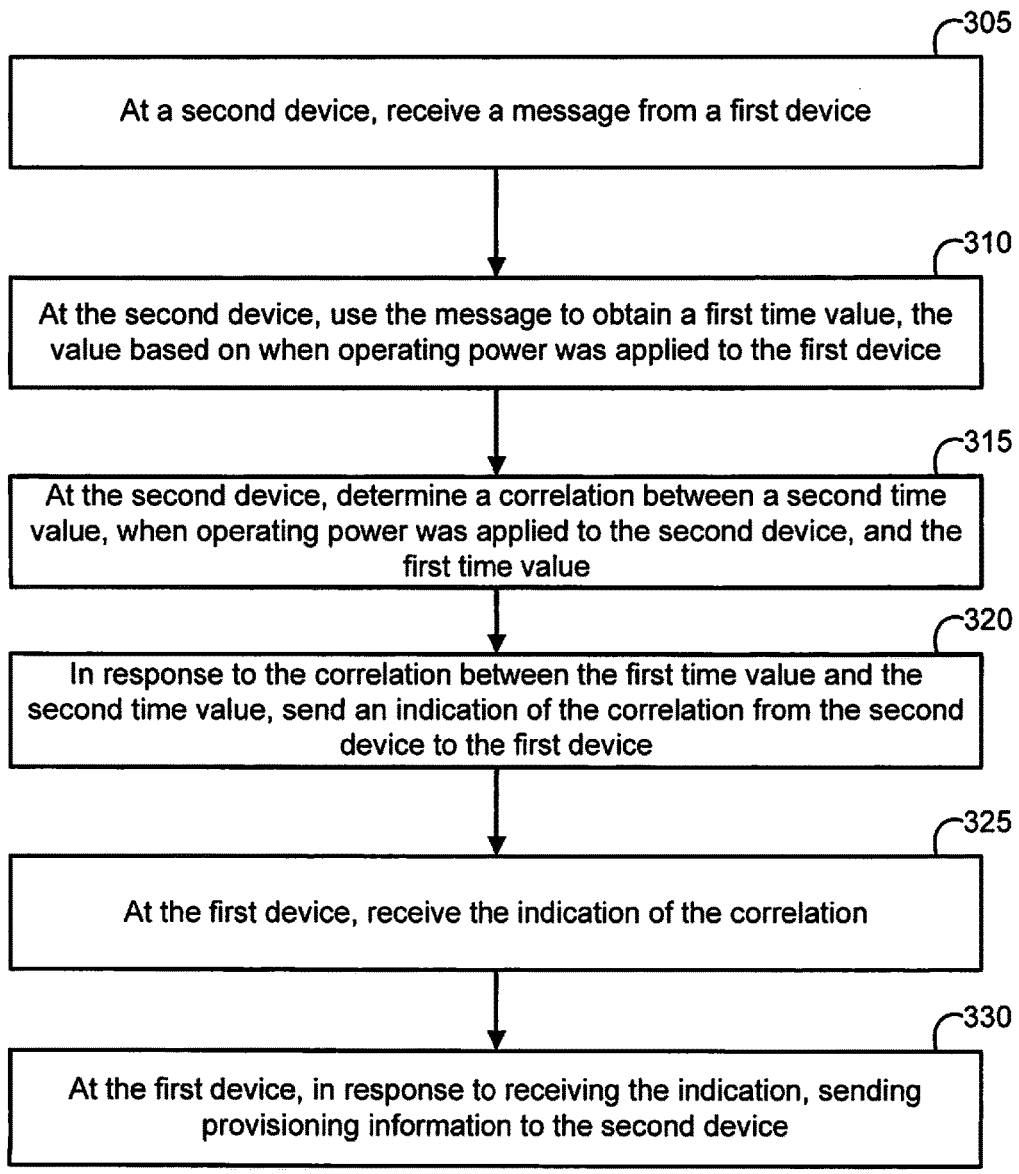
FIG. 3 is another illustration of an exemplary method of provisioning a device according to some aspects of the present disclosure.

FIG. 3 is another illustration of an exemplary method of provisioning a device according to some aspects of the present disclosure. Here, this method may be used to provision an unprovisioned device that is on the same power switch as another device which is already provisioned, such as when two smart light bulbs may be on the same light switch. The method may also be used to provision devices that are not on the same switch, but which may be turned on or off, such as by a user, at the same time. This method is merely exemplary, and certain portions of the illustrated method may be omitted, such as certain authentication steps. In some aspects, this method may be carried out on a provisioned device on a wireless communication network that is configured to provide provisioning information to other devices.

At block 305, a second device receives a message from a first device. For example, the second device may be a device that is not provisioned for a wireless network, but is configured to be provisioned by another device for such a network. The message from the first device may be transmitted in order to allow devices, like the second device, to gain access to the wireless network. This message may be broadcast, such as being broadcast on a channel which other devices may be configured to listen for messages on. In some aspects, the message may be received using a receiver and may be transmitted in a packet over a wireless medium.

At block 310, the second device uses the message to obtain a first time value, the value based on when operating power was applied to the first device. For example, the first device may transmit a message that indicates when the device received operating power or was turned on. The message may indicate this by transmitting a time the first device received operating power, a counter value, or this value may be inferred based on when the message was transmitted or received. For example, the time value may be the time at which the message was received by the second device. The time value may also be included in the message, and may be a value such as the time when the message was transmitted, or when the device received operating power. The second device may thus use the message to obtain the first time value. The second device may use a receiver or a processor to obtain the first time value.

At block 315, the second device determines a correlation between a second time value, when operating power was applied to the second device, and the first time value. The second device may be configured to start a counter or to record the time when it receives operating power. This value may be used as a second time value, and the second time value may be compared to the first time value. For example, this correlation may include calculating a difference between the first time value and the second time value, such that the second device can determine whether the two devices received operating power at the same time or at very close to the same time. In some aspects, the second device may use a processor to determine correlations between the two time values. As described here, the second device, that is, the device that is requesting provisioning information, may determine the correlation between the two time values. This may also be done, as in FIG. 2, by the first device.

At block 320, in response to the correlation between the first time value and the second time value, the second device sends an indication of the correlation to the first device. For example, if the two time values are similar enough to each other, such as satisfying a threshold (e.g., being below a threshold difference value between the first time value and the second time value), the second device may transmit an indication to the first device. This indication may request provisioning information, and may inform the first device of the correlation in operating power time values between the two devices. This indication may be transmitted using a transmitter, and may take the form of a packet transmitted over a wireless medium.

At block 325, the first device receives the indication. For example, the first device may receive the indication over the wireless medium, using a receiver. The first device may be configured to listen for indications after it transmits the message, to learn if there are other devices in the area which may request provisioning for the wireless network.

At block 330, the first device, in response to receiving the indication, sends provisioning information to the second device. For example, the first device may use a transmitter to transmit provisioning information to the second device. This information may be included in a packet transmitted over a wireless medium. The provisioning information may allow the second device to access a wireless network, such as a Wi-Fi network. For example, the provisioning information may include a SSID of a network, and security information such as a password for the network. The provisioning information may be encrypted, in order to help secure access to the wireless network. In some aspects, the first device may transmit the provisioning information only after receiving instructions from a user. These instructions may include, for example, asking a user if a new device was added to a house or other environment, and only providing provisioning information if the user indicates a new device was added.

Figure 4:
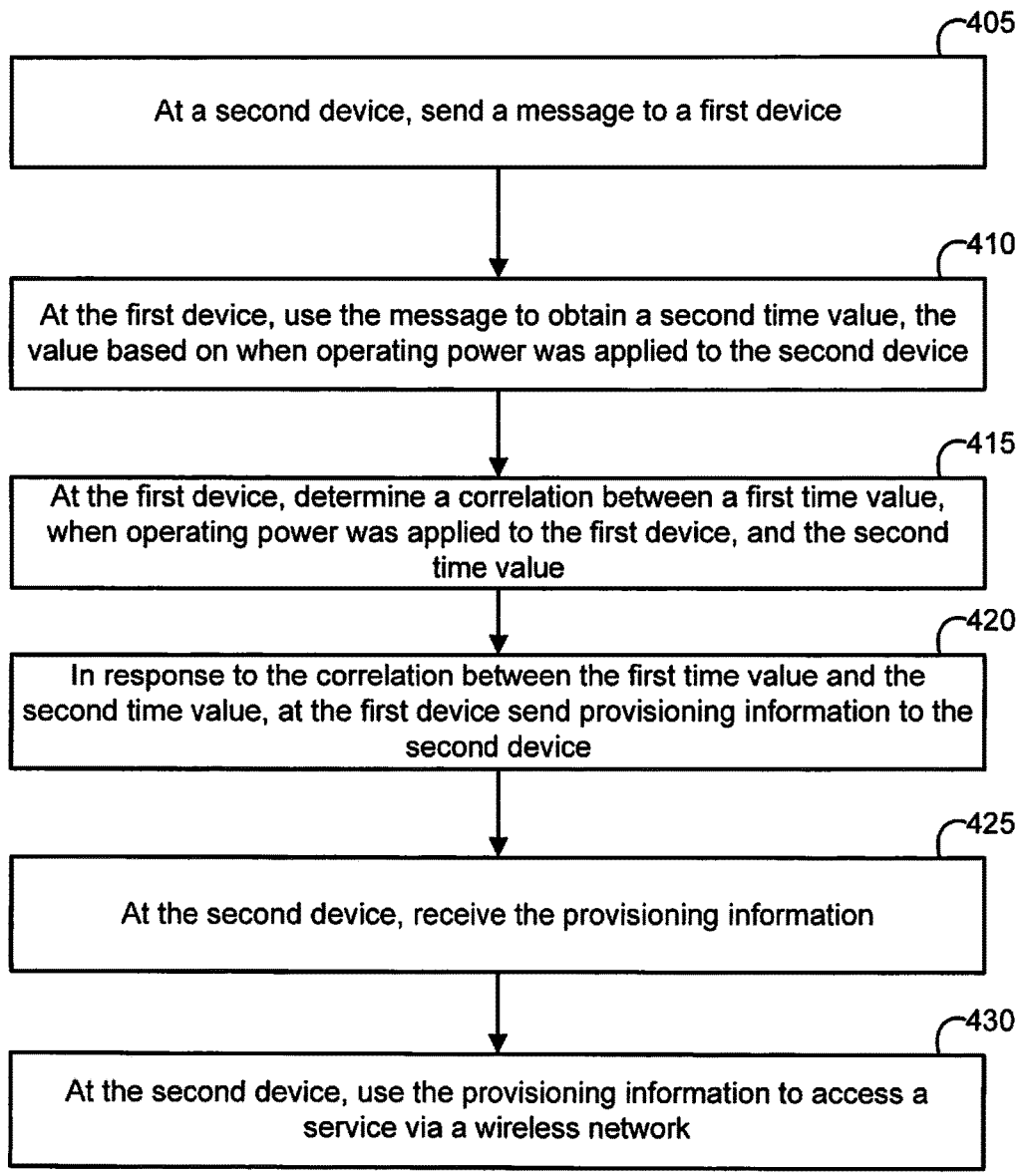
FIG. 4 illustrates an exemplary method of receiving provisioning information and using the information to access a wireless network according to some aspects of the present disclosure.

FIG. 4 illustrates an exemplary method of receiving provisioning information and using the information to access a wireless network according to some aspects of the present disclosure. In this method, a device that has provisioning information may determine a correlation between the application of operating power with it and another device, and provide provisioning information based on the correlation.

At block 405, a second device sends a message to a first device. The second device may be a device that is not provisioned to access a service via a wireless network, while the first device may be provisioned to access the service. In some aspects, the message may indicate to the first device that the second device wishes to be provisioned to access a service via the wireless network. The message may also include information about when the second device received operating power. This message may be sent using a transmitter over a wireless medium. The device may be configured to broadcast this message in response to operating power being applied to the device.

At block 410, the first device uses the message to obtain a second time value, the value based on when operating power was applied to the second device. This second time value may be, for example, a counter value indicating a number of milliseconds or clock cycles since the second device received operating power. This second time value may also be a time, such as a time when the second device received operating power. The second time value may be inferred based on when the message was transmitted, as the second device may be configured to transmit a message a given interval of time after it receives operating power. The first device may use a receiver to receive the message and to obtain the second time value.

At block 415, the first device determines a correlation between a first time value, when operating power was applied to the first device, and the second time value. For example, this correlation may include determining whether the two devices were supplied with operating power at substantially the same time, such as within a time interval of under 1, 5, 10, or 100 milliseconds. Such an indication may be used to determine if the two devices are on the same light switch, or if a user otherwise turned on the two devices at the same time. Such an indication may allow for devices to provision each other, so they can be part of the same network, such as an Internet of Things (IoT) system in a home. The first device may determine this correlation using a processor.

At block 420, in response to the correlation between the first time value and the second time value, the first device sends provisioning information to the second device. The provisioning information includes information sufficient to allow the second device to access a service via the wireless network. For example, this information may include an SSID of a network, and also include security information, such as a password, for that network. This information may be encrypted, in order to increase the security of the network. The first device may send this information using a transmitter.

At block 425, the second device receives the provisioning information. This information may be received using a receiver that can receive packets on the wireless medium. The provisioning information may be provided after a user allows the first device to provide the provisioning information, or may be provided without other user intervention.

At block 430, the second device uses the provisioning information to access a service via the wireless network. For example, the provisioning information may be used by the second device to access a wireless network, such as a Wi-Fi network. This information may also allow the second device to become part of a household IoT network. For example, if the second device is a smart light bulb, it may receive provisioning information that allows a user to access the various functions of the smart light bulb using a smartphone app or another device. Accordingly, this method may be used to allow IoT devices to provision one another, which may be especially useful for devices that lack a user interface, or where it would be inconvenient to have a user manually provision each new device.

Figure 5:
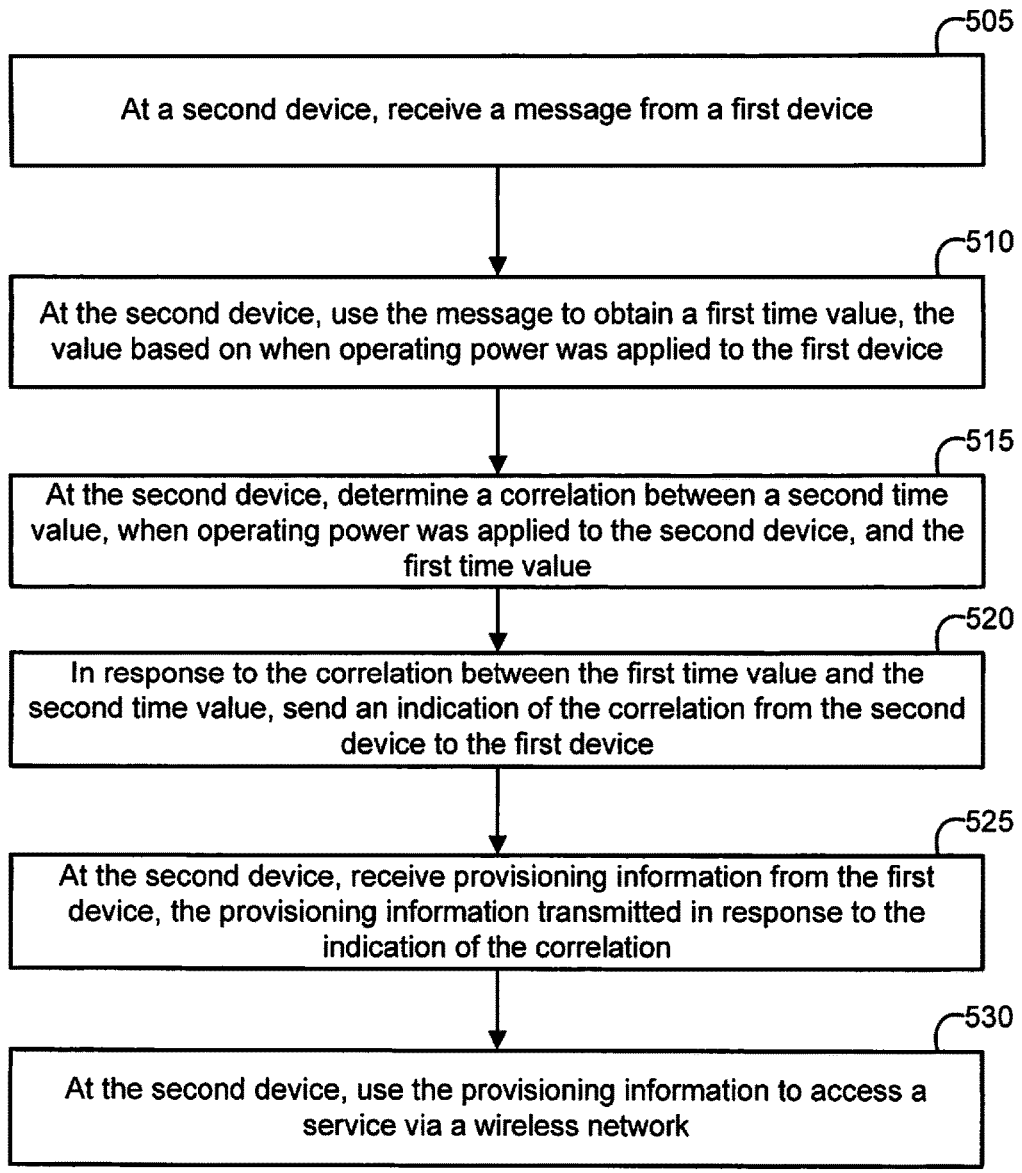
FIG. 5 illustrates an exemplary method of receiving provisioning information and using the information to access a wireless network according to some aspects of the present disclosure.

FIG. 5 illustrates an exemplary method of receiving provisioning information and using the information to access a wireless network according to some aspects of the present disclosure. In this method, a device that lacks provisioning information may determine a correlation between the application of operating power with it and another device, and request provisioning information based on the correlation.

At block 505, a second device receives a message from a first device. The second device may be a device that is not provisioned to access a service via a wireless network, while the first device may be provisioned to access the service. In some aspects, the message may indicate to the second device that the first device is configured to provision other devices to access a service via a wireless network. The message may also include information about when the first device received operating power. This message may be sent using a transmitter over a wireless medium. For example, this message may be transmitted on a wireless medium at a frequency that the second device is configured to scan, such that the second device may search for such a message when it receives operating power while unprovisioned. This message may be broadcast by the device in response to it receiving operating power.

At block 510, the second device uses the message to obtain a first time value, the value based on when operating power was applied to the first device. This first time value may be, for example, a counter value indicating a number of milliseconds or clock cycles since the first device received operating power. This first time value may also be a time, such as a time when the first device received operating power. The first time value may be inferred based on when the message was transmitted, as the first device may be configured to transmit a message a given interval of time after it receives operating power. The second device may use a receiver to receive the message and to obtain the first time value.

At block 515, the second device determines a correlation between a second time value, when operating power was applied to the second device, and the first time value. For example, this correlation may include determining whether the two devices were supplied with operating power at substantially the same time, such as within a time interval of under 1, 5, 10, or 100 milliseconds. Such an indication may be used to determine if the two devices are on the same light switch, or if a user otherwise turned on the two devices at the same time. Such an indication may allow for devices to provision each other, so they can be part of the same network, such as an IoT system in a home. The second device may determine this correlation using a processor.

At block 520, in response to the correlation between the first time value and the second time value, the second device sends an indication of the correlation to the first device. This indication of the correlation may include, for example, a request for provisioning information from the first device. The indication may also include a difference between the two time values. The indication may also include an identification of the second device. The indication may be sent using a transmitter transmitting on the wireless medium.

At block 525, the second device receives provisioning information from the first device, the provisioning information transmitted in response to the indication of the correlation. This information may be received using a receiver that can receive packets on the wireless medium. The provisioning information may be provided after a user allows the first device to provide the provisioning information, or may be provided without other user intervention. The first device may be configured to review the indication of the correlation, and based on this indication, to transmit provisioning information to the second device. This provisioning information may allow the second device to access a service via the wireless network.

At block 530, the second device uses the provisioning information to access a service via the wireless network. For example, the provisioning information may be used by the second device to access a wireless network, such as a Wi-Fi network. This information may also allow the second device to become part of a household IoT network. For example, if the second device is a smart light bulb, it may receive provisioning information that allows a user to access the various functions of the smart light bulb using a smartphone app or another device. Accordingly, this method may be used to allow IoT devices to provision one another, which may be especially useful for devices that lack a user interface, or where it would be inconvenient to have a user manually provision each new device.

The provisioning information that is provided to a wireless device, such as a smart light bulb or another type of device that may access a wireless network, may vary depending upon the network and the services that the device is to access. This provisioning information may include a credential for a wireless network, such as a password for a network, a username for a network, a name of the wireless network, or another credential. Similarly, the provisioning information may include a credential for a service, such as in IoT service that is used by a user, including a username for the service, a password for the service, or a name of the service. The provisioning information may also include a cryptographic key, such as a key that may allow a device to communicate with a network or a service in an encrypted, secure manner. Such a key may include, for example, a key that allows the device to encrypt communications. The cryptographic key may be a part of an asymmetric cryptography scheme.

Figure 6:
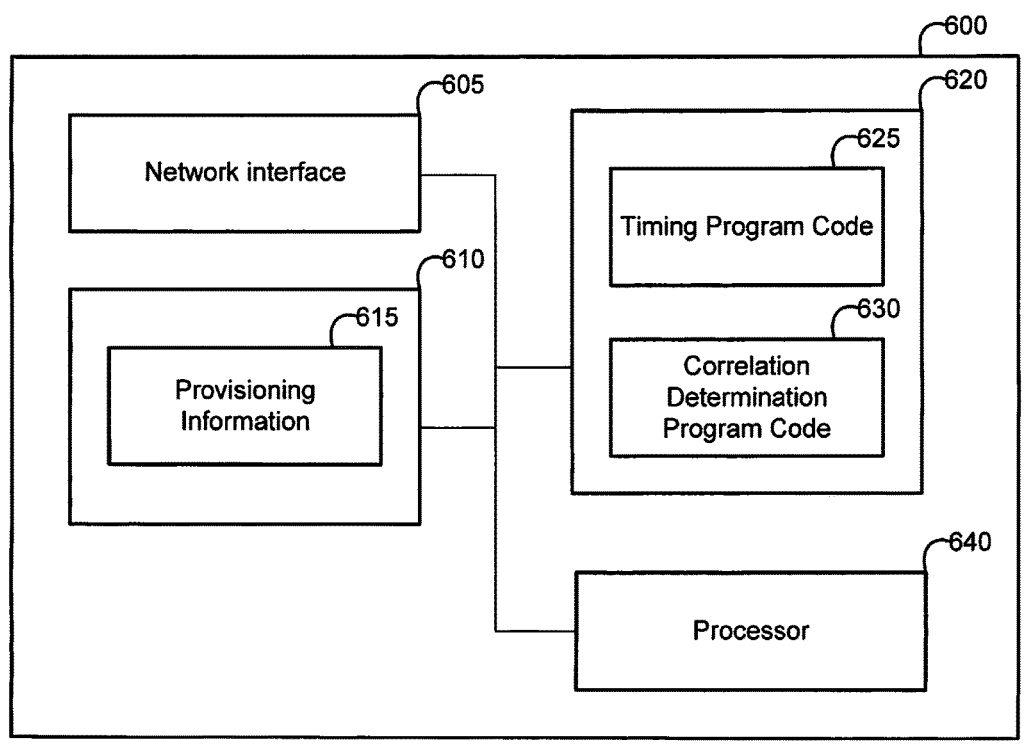
FIG. 6 illustrates an exemplary apparatus for provisioning, according to some aspects of the present disclosure.

FIG. 6 is an illustration of an apparatus for provisioning, according to some aspects of the present disclosure. This apparatus 600 may be a connected home device, such as a smart light bulb, or another device. The apparatus 600 includes a network interface 605. The network interface 605 may include a transmitter and a receiver, or a transceiver. The network interface 605 may be configured to communication using Wi-Fi or another wireless communication technique, and may be configured to be able communicate directly with other similar apparatuses to apparatus 600. Each portion of apparatus 600 is merely exemplary, and portions may be combined with one another as may be convenient. Apparatus 600 may also include other elements. For example, if apparatus 600 is a smart light bulb, it will also include lighting elements in order to operate as a light bulb.

The apparatus 600 may include a memory 610. This memory 610 may be a transitory memory, such as random access memory, or a non-transitory memory, such as a hard drive or a flash drive. Other types of memories may also be used. The memory 610 may include a portion 615 which is configured to store provisioning information. If the apparatus 600 is aware of provisioning information for the network, this information may be stored in the portion 615 configured to store such information. If the apparatus 600 is not aware of provisioning information, it may be configured to attempt to receive provisioning information and may have a portion 615 of its memory set aside for storing such information. The apparatus 600 also includes a processor 640, which is operable connected to both the network interface 605 and the memory 610. The processor 640 may be a general-purpose processor, or a specialized processor. The processor 640 may be a single processor, or its various functions may be done by multiple processors.

The apparatus 600 also includes program memory 620, which is used to store program code. The program memory 620 may be combined with memory 610, in some cases. The program memory 620 contains program code, which may be executed by the processor 640 in order to perform various functions. The program memory 620 includes timing program code 625, which may be used to determine certain timings for the apparatus 600. For example, timing program code 625 may contain instructions that configured the processor 640 to determine when the apparatus 600 received operating power. For example, timing program code 625 may configured the processor 640 to begin a timer or another mechanism during a portion of a boot sequence of apparatus 600, such that the output of timing program code 625, be it a running counter or a static time, may be used to infer when operating power was applied to apparatus 600. In some aspects, the timing program code 625 may contain instructions which configure the processor 640 to transmit a time value, based on when the apparatus 600 received operating power, to another device using the network interface 605.

The program memory 620 also includes correlation determination program code 630, which includes instructions that configured the processor 640 to determine a correlation between the output of the timing program code 625 and a received time, such as a time received from another device using network interface 605. For example, the received timing information may be a time value based on when another device received operating power. The correlation determination program code 630 may configured the processor 640 to compare that received value with the time value from the timing program code 625, in order to determine a correlation between the two time values. The correlation determination program code 630 may also include further instructions, such as instructions that allow the processor 640 to follow certain steps based on this correlation. For example, as described above in detail, the processor 640 may transmit provisioning information based on this correlation, or may transmit an indication to another device of the correlation, in order to receive provisioning information. Generally, the program memory 620 may also include other components, and the illustrated components may be combined or split apart into separate components.

Figure 7:
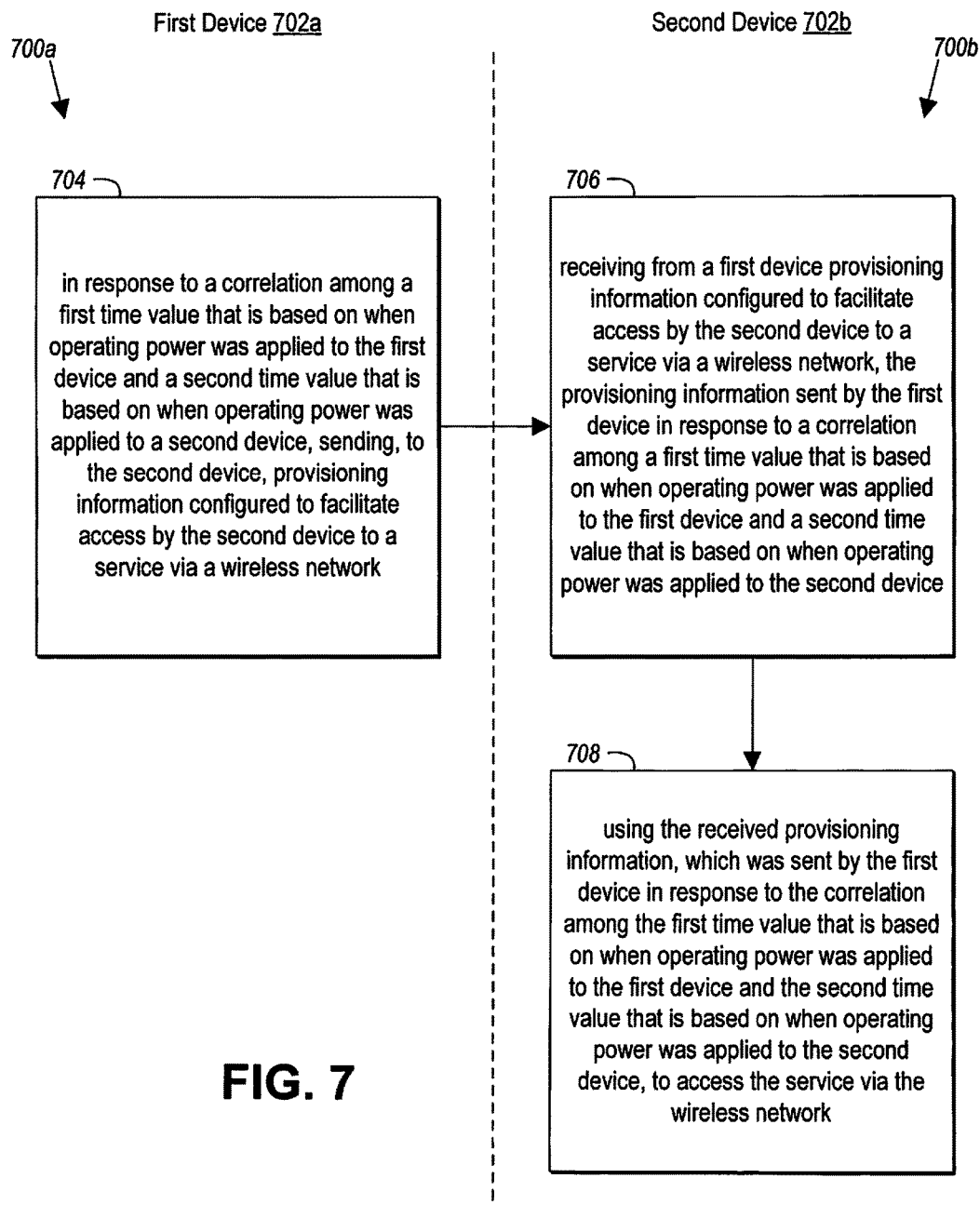
FIG. 7 illustrates exemplary methods for provisioning, according to some aspects of the present disclosure.

FIG. 7 illustrates methods 700a and 700b that may be performed by one or more devices (e.g., the home device 130 in FIG. 1; the home device 135 in FIG. 1; the apparatus 600 in FIG. 6; one or more other devices, e.g., one or more electric devices; or any combination thereof). For example, the method 700a may be performed by a first device 702a and the method 700b may be performed by a second device 702b. In some embodiments, the first device 702a, the second device 702b, or both may be wireless devices, that is, devices configured to communicate wirelessly. Thus, in some embodiments, the first device 702a and the second device 702b may communicate wirelessly with each other and/or other devices, if desired. It will be appreciated, however, that the first device 702a, the second device 702b may be wireless devices and may also communicate via one or more wired connections, such as a powerline network connection or other suitable wired connections.

At block 704 in method 700a, the first device 702a may, in response to a correlation among a first time value that is based on when operating power was applied to the first device 702a and a second time value that is based on when operating power was applied to a second device (e.g., the second device 702b), send, to the second device 702b, provisioning information configured to facilitate access by the second device 702b to a service via a wireless network.

At block 706 in method 700b, the second device 702b may receive from a first device (e.g., the first device 702a) provisioning information configured to facilitate access by the second device 702b to a service via a wireless network, the provisioning information sent by the first device 702a in response to a correlation among a first time value that is based on when operating power was applied to the first device 702a and a second time value that is based on when operating power was applied to the second device 702b (e.g., the provisioning information sent by the first device 702a at block 704 in method 700a).

At block 708 in method 700b, the second device 702b may use the received provisioning information, which was sent by the first device 702a in response to the correlation among the first time value that is based on when operating power was applied to the first device 702a and the second time value that is based on when operating power was applied to the second device 702b, to access the service via the wireless network. In some embodiments, the provisioning information may include a credential for the wireless network (e.g., one or more of a WIFI network name, a WIFI network password and/or other suitable credential), a credential for the service (e.g., a login name, a login password and/or other suitable credential), a cryptographic key, other provisioning information, or any combination thereof.

Figure 8:
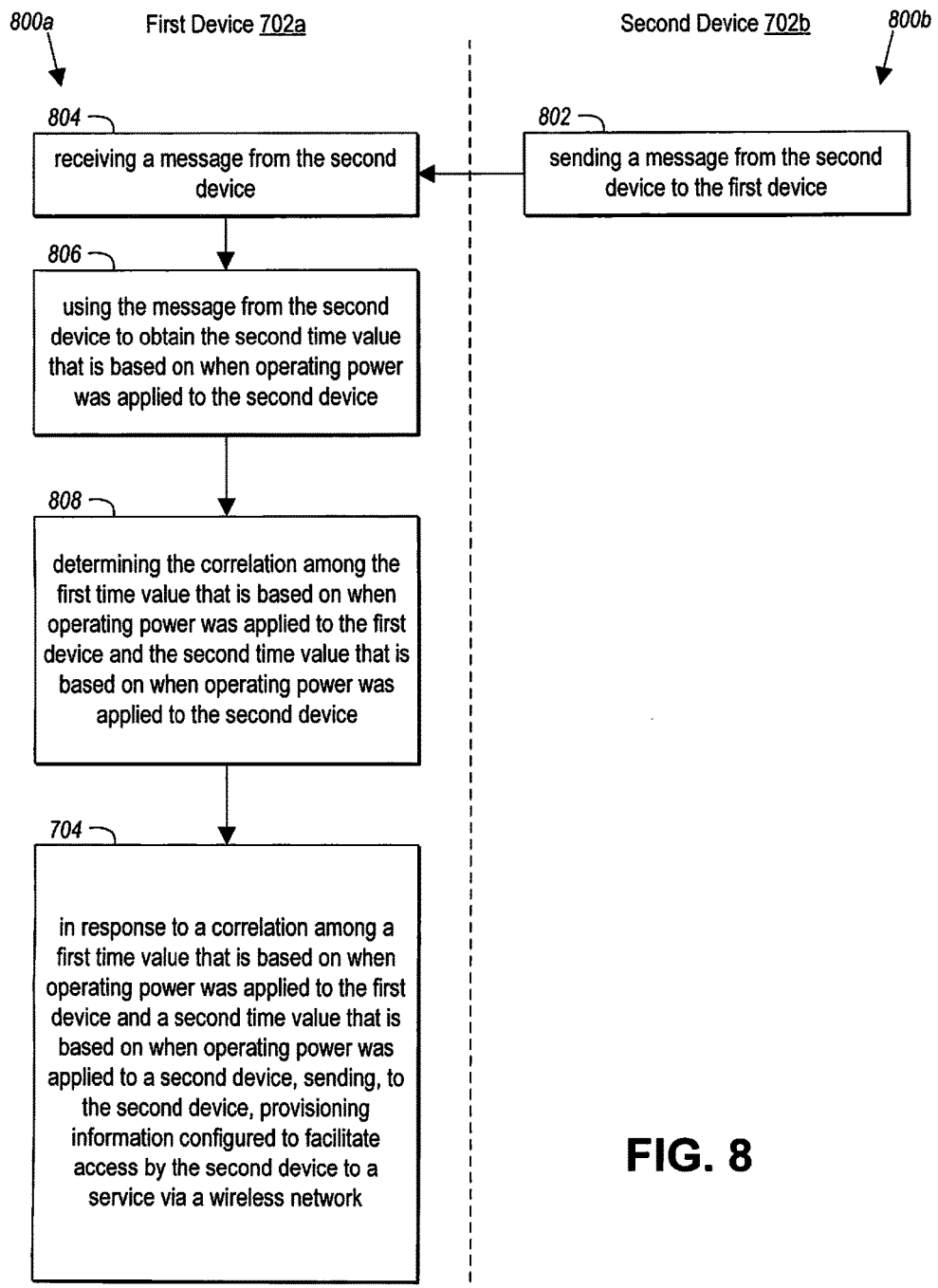
FIG. 8 illustrates exemplary methods for provisioning, according to some aspects of the present disclosure.

As illustrated above, the first device 702a may, in response to a correlation among a first time value that is based on when operating power was applied to the first device 702a and a second time value that is based on when operating power was applied to the second device 702b, send provisioning information to the second device 702b to facilitate access to a service via a wireless network. In some embodiments, as illustrated by FIG. 8 below, the first device 702a may determine the correlation among the first time value that is based on when operating power was applied to the first device 702a and the second time value that is based on when operating power was applied to the second device 702b. In some embodiments, as illustrated by FIG. 9 below, the second device 702b may determine the correlation among the first time value that is based on when operating power was applied to the first device 702a and the second time value that is based on when operating power was applied to the second device 702b.

FIG. 8 illustrates methods 800a and 800b that may be performed by one or more devices (e.g., the home device 130 in FIG. 1, the home device 135 in FIG. 1, the apparatus 600 in FIG. 6, one or more other devices, or any combination thereof). For example, the method 800a may be performed by the first device 702a and the method 800b may be performed by the second device 702b. As noted above, in some embodiments, the first device 702a, the second device 702b, or both may be wireless devices and may communicate with each other via wired connections, wired connections, or both.

At block 802 of method 800b, the second device 702b may send a message from the second device 702b to the first device 702a. In some embodiments, at block 802, the second device 702b may broadcast or otherwise send the message in response to the operating power that was applied to the second device 702b. In some embodiments, the first device 702a may broadcast or otherwise send a first message in response to the operating power that was applied to the first device 702a, and the second device 702b may send, in response to receiving the first message, the message at block 802.

At block 804 of method 800a, the first device 702a may receive a message from the second device 702b (e.g., the message sent by the second device 702b at block 802 in method 800b).

At block 806, the first device 702a may use the message from the second device 702b to obtain the second time value that is based on when operating power was applied to the second device 702b. In some embodiments, at block 806, the first device 702a may generate the second time value from a time when the first device 702a received the message from the second device 702b at block 804. In some embodiments, the message from the second device 702b includes the second time value that is based on when operating power was applied to the second device 702b, and at block 806, the first device 702a may read or otherwise obtain the second time value from the message. For example, the second time value included in the message may be a time value indicating when the second device sent the message. Also, for example, the second time value included in the message may be a time value indicating when operating power was applied to the second device.

At block 808, the first device 702a may determine the correlation among the first time value that is based on when operating power was applied to the first device 702a and the second time value that is based on when operating power was applied to the second device 702b.

As shown in FIG. 8, the first device 702a may also perform block 704 of method 700a—which, in some embodiments, may comprise the first device 702a, in response to determining the correlation among the first time value that is based on when operating power was applied to the first device 702a and the second time value that is based on when operating power was applied to the second device 702b, sending, to the second device 702b, the provisioning information configured to facilitate access by the second device 702b to the service via the wireless network.

FIG. 9 illustrates methods 900a and 900b that may be performed by one or more devices (e.g., the home device 130 in FIG. 1, the home device 135 in FIG. 1, the apparatus 600 in FIG. 6, one or more other devices, or any combination thereof). For example, the method 900a may be performed by the first device 702a and the method 900b may be performed by the second device 702b. As noted above, in some embodiments, the first device 702a, the second device 702b, or both may be wireless devices and may communicate with each other via wired connections, wired connections, or both.

At block 902 of method 900a, the first device 702a may send a message from the first device 702a to the second device 702b. In some embodiments, at block 902, the first device 702a may broadcast or otherwise send the message in response to the operating power that was applied to the first device 702a. In some embodiments, the second device 702b may broadcast or otherwise send a first message in response to the operating power that was applied to the second device 702b, and the first device 702a may send, in response to receiving the first message, the message at block 902.

At block 904 of method 900b, the second device 702b may receive a message from the first device 702a (e.g., the message sent by the first device 702a at block 902 of method 900a).

At block 906, the second device 702b may use the message from the first device 702a to obtain the second time value that is based on when operating power was applied the first device 702a. In some embodiments, at block 906, the second device 702b may generate the first time value from a time when the second device 702b received the message from the first device 702a at block 904. In some embodiments, the message from the first device 702a includes the first time value that is based on when operating power was applied to the first device 702a, and at block 906, the second device 702b may read or otherwise obtain the first time value from the message. For example, the first time value included in the message may be a time value indicating when the first device 702a sent the message. Also, for example, the first time value included in the message may be a time value indicating when operating power was applied to the first device 702a.

At block 908, the second device 702b may determine the correlation among the first time value that is based on when operating power was applied to the first device 702a and the second time value that is based on when operating power was applied to the second device 702b.

At block 910, the second device 702b may send, to the first device 702a, an indication of the correlation among the first time value that is based on when operating power was applied to the first device 702a and the second time value that is based on when operating power was applied to the second device 702b.

At block 912 of method 900a, the first device 702a may receive, from the second device 702b, an indication of the correlation among the first time value that is based on when operating power was applied to the first device 702a and the second time value that is based on when operating power was applied to the second device 702b (e.g., the indication sent by the second device 702b at block 910 of method 900b).

As shown in FIG. 9, the first device 702a may also perform block 704 of method 700a—which, in some embodiments, may comprise the first device 702a, in response to receiving, from the second device 702b, the indication of the correlation among the first time value that is based on when operating power was applied to the first device 702a and the second time value that is based on when operating power was applied to the second device 702b, sending, to the second device 702b, the provisioning information configured to facilitate access by the second device 702b to the service via the wireless network.

Using one or more of the elements, techniques, and/or components described above, a suitable device configured to provision other devices based on a correlated values can be designed. Further embodiments can be envisioned to one of ordinary skill in the art after reading this disclosure. In other embodiments, combinations or sub-combinations of the above disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

The terminology used herein is for the purpose of describing particular implementations only and is not intended to be limiting of the disclosure. It will be understood by those within the art that if a specific number of a claim element is intended, such intent will be explicitly recited in the claim, and in the absence of such recitation, no such intent is present. For example, as used herein, the singular forms "a", "an" and "the" are intended to include the plural forms as well, unless the context clearly indicates otherwise. As used herein, the term "and/or" includes any and all combinations of one or more of the associated listed items. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The use of any and all examples is intended merely to better illuminate embodiments of the invention and does not pose a limitation on the scope of the invention unless otherwise claimed. No language in the specification should be construed as indicating any non-claimed element as essential to the practice of the invention.

What is claimed is:

1. A method for provisioning, the method comprising:
by a first device, in response to a correlation among a first time value that is based on when operating power was applied to the first device and a second time value that is based on when operating power was applied to a second device, sending, to the second device, provisioning information configured to facilitate access by the second device to a service via a wireless network, wherein the provisioning information is configured for use by the second device to access the service via the wireless network.

2. The method of claim 1, further comprising:
by the first device, receiving a message from the second device;

by the first device, using the message from the second device to obtain the second time value that is based on when operating power was applied to the second device; and by the first device, determining the correlation among the first time value that is based on when operating power was applied to the first device and the second time value that is based on when operating power was applied to the second device; and wherein in response to the correlation among the first time value that is based on when operating power was applied to the first device and the second time value that is based on when operating power was applied to the second device, sending, to the second device, provisioning information configured to facilitate access by the second device to the service via the wireless network comprises:

by the first device, in response to determining the correlation among the first time value that is based on when operating power was applied to the first device and the second time value that is based on when operating power was applied to the second device, sending, to the second device, the provisioning information configured to facilitate access by the second device to the service via the wireless network.

3. The method of claim 1, further comprising:
by the first device, sending a message from the first device to the second device, wherein the second device is configured to:
a) receive the message from the first device;
b) use the message from the first device to obtain the first time value that is based on when operating power was applied to the first device;
c) determine the correlation among the first time value that is based on when operating power was applied to the first device and the second time value that is based on when operating power was applied to the second device; and
d) send, to the first device, an indication of the correlation among the first time value that is based on when operating power was applied to the first device and the second time value that is based on when operating power was applied to the second device; and by the first device, receiving, from the second device, the indication of the correlation among the first time value that is based on when operating power was applied to the first device and the second time value that is based on when operating power was applied to the second device; and wherein in response to the correlation among the first time value that is based on when operating power was applied to the first device and the second time value that is based on when operating power was applied to the second device, sending, to the second device, provisioning information configured to facilitate access by the second device to the service via the wireless network comprises:

by the first device, in response to receiving, from the second device, the indication of the correlation among the first time value that is based on when operating power was applied to the first device and the second time value that is based on when operating power was applied to the second device, sending, to the second device, the provisioning information configured to facilitate access by the second device to the service via the wireless network.

4. The method of claim 1, wherein the provisioning information, which is sent by the first device to the second device in response to the correlation among the first time value that is based on when operating power was applied to the first device and the second time value that is based on when operating power was applied to the second device, comprises a network name for accessing the wireless network and a network password for accessing the wireless network; and wherein the second device is configured to use the network name and the network password, which are sent by the first device to the second device in response to the correlation among the first time value that is based on when operating power was applied to the first device and the second time value that is based on when operating power was applied to the second device, to access the service via the wireless network.

5. A method for provisioning comprising:
by a wireless device, receiving, from a first device, provisioning information configured to facilitate access by the wireless device to a service via a wireless network, the provisioning information sent by the first device in response to a correlation among a first time value that is based on when operating power was applied to the first device and a second time value that is based on when operating power was applied to the wireless device; and by the wireless device, using the received provisioning information, which was sent by the first device in response to the correlation among the first time value that is based on when operating power was applied to the first device and the second time value that is based on when operating power was applied to the wireless device, to access the service via the wireless network.

6. The method of claim 5, further comprising:
by the wireless device, sending a message from the wireless device to the first device, wherein the first device is configured to:
a) receive the message from the wireless device;
b) use the message from the wireless device to obtain the second time value that is based on when operating power was applied to the wireless device;
c) determine the correlation among the first time value that is based on when operating power was applied to the first device and the second time value that is based on when operating power was applied to the wireless device; and
d) in response to determining the correlation among the first time value that is based on when operating power was applied to the first device and the second time value that is based on when operating power was applied to the wireless device, send, to the wireless device, the provisioning information configured to facilitate access by the wireless device to the service via the wireless network.

7. The method of claim 5, further comprising:
by the wireless device, receiving a message from the first device;
by the wireless device, using the message from the first device to obtain the first time value that is based on when operating power was applied to the first device;
by the wireless device, determining the correlation among the first time value that is based on when operating power was applied to the first device and the second time value that is based on when operating power was applied to the wireless device; and by the wireless device, sending, to the first device, an indication of the correlation among the first time value that is based on when operating power was applied to the first device and the second time value that is based on when operating power was applied to the wireless device, wherein the first device is configured to:
 a) receive, from the wireless device, the indication of the correlation among the first time value that is based on when operating power was applied to the first device and the second time value that is based on when operating power was applied to the wireless device; and
 b) in response to receiving, from the wireless device, the indication of the correlation among the first time value that is based on when operating power was applied to the first device and the second time value that is based on when operating power was applied to the wireless device, send, to the wireless device, the provisioning information configured to facilitate access by the wireless device to the service via the wireless network.

8. An apparatus for provisioning, the apparatus comprising:
 a first device comprising:
 a processor configured with processor-executable instructions to perform operations comprising:
 in response to a correlation among a first time value that is based on when operating power was applied to the first device and a second time value that is based on when operating power was applied to a second device, sending, to the second device, provisioning information configured to facilitate access by the second device to a service via a wireless network, wherein the provisioning information is configured for use by the second device to access the service via the wireless network.

9. The apparatus of claim 8, wherein the processor is configured with processor-executable instructions to perform operations further comprising determining the correlation among the first time value that is based on when operating power was applied to the first device and the second time value that is based on when operating power was applied to the second device.

10. The apparatus of claim 9, wherein the processor is configured with processor-executable instructions to perform operations such that:
 in response to the correlation among the first time value that is based on when operating power was applied to the first device and the second time value that is based on when operating power was applied to the second device, sending, to the second device, the provisioning information configured to facilitate access by the second device to the service via the wireless network comprises:
  in response to determining the correlation among the first time value that is based on when operating power was applied to the first device and the second time value that is based on when operating power was applied to the second device, sending, to the second device, the provisioning information configured to facilitate access by the second device to the service via the wireless network.

11. The apparatus of claim 9, wherein the processor is configured with processor-executable instructions to perform operations further comprising:
 receiving a message from the second device; and
 using the message from the second device to obtain the second time value that is based on when operating power was applied to the second device.

12. The apparatus of claim 11, wherein the message from the second device was broadcast by the second device in response to the operating power that was applied to the second device.

13. The apparatus of claim 11, wherein the processor is configured with processor-executable instructions to perform operations further comprising:
 broadcasting a first message in response to the operating power that was applied to the first device; and
 wherein the second device sent, in response to receiving the first message, the message from the second device.

14. The apparatus of claim 11, wherein the processor is configured with processor-executable instructions to perform operations such that using the message from the second device to obtain the second time value comprises generating the second time value from a time when the first device received the message from the second device.

15. The apparatus of claim 11, wherein the message from the second device includes the second time value that is based on when operating power was applied to the second device.

16. The apparatus of claim 15, wherein the second time value, which is included in the message from the second device and which is based on when operating power was applied to the second device, is a time value indicating when the second device sent the message.

17. The apparatus of claim 15, wherein the second time value, which is included in the message from the second device and which is based on when operating power was applied to the second device, is a time value indicating when operating power was applied to the second device.

18. The apparatus of claim 8, wherein the processor is configured with processor-executable instructions to perform operations further comprising receiving, from the second device, an indication of the correlation among the first time value that is based on when operating power was applied to the first device and the second time value that is based on when operating power was applied to the second device.

19. The apparatus of claim 18, wherein the processor is configured with processor-executable instructions to perform operations such that:
 in response to the correlation among the first time value that is based on when operating power was applied to the first device and the second time value that is based on when operating power was applied to the second device, sending, to the second device, the provisioning information configured to facilitate access by the second device to the service via the wireless network comprises:
  by the first device, in response to receiving, from the second device, the indication of the correlation among the first time value that is based on when operating power was applied to the first device and the second time value that is based on when operating power was applied to the second device, sending, to the second device, the provisioning information configured to facilitate access by the second device to the service via the wireless network.

20. The apparatus of claim 18, wherein the processor is configured with processor-executable instructions to perform operations further comprising:
 sending a message from the first device to the second device; and wherein the second device is configured to use the message from the first device to obtain the first time value that is based on when operating power was applied to the first device.

21. The apparatus of claim 20, wherein the processor is configured with processor-executable instructions to perform operations such that sending the message from the first device to the second device comprises broadcasting the message from the first device in response to the operating power that was applied to the first device.

22. The apparatus of claim 20, wherein the processor is configured with processor-executable instructions to perform operations further comprising:
receiving a first message from the second device; and
wherein sending the message from the first device to the second device comprises sending the message from the first device in response to receiving the first message from the second device.

23. The apparatus of claim 20, wherein the second device is configured to use the message from the first device to obtain the first time value by generating the second time value from a time when the second device received the message from the first device.

24. The apparatus of claim 20, wherein the message from the first device includes the first time value.

25. The apparatus of claim 24, wherein the first time value included in the message from the first device is a time value indicating when the first device sent the message.

26. The apparatus of claim 24, wherein the first time value included in the message from the first device is a time value indicating when operating power was applied to the first device.

27. The apparatus of claim 8, wherein the provisioning information, which is sent to the second device in response to the correlation among the first time value that is based on when operating power was applied to the first device and the second time value that is based on when operating power was applied to the second device, includes at least one of a credential for the wireless network, a credential for the service, or a cryptographic key.

28. A wireless device comprising:
a processor configured with processor-executable instructions to perform operations comprising:
receiving, from a first device, provisioning information configured to facilitate access by the wireless device to a service via a wireless network, the provisioning information sent by the first device in response to a correlation among a first time value that is based on when operating power was applied to the first device and a second time value that is based on when operating power was applied to the wireless device; and
using the received provisioning information, which was sent by the first device in response to the correlation among the first time value that is based on when operating power was applied to the first device and the second time value that is based on when operating power was applied to the wireless device, to access the service via the wireless network.

29. The wireless device of claim 28, wherein the processor is configured with processor-executable instructions to perform operations further comprising sending a message from the wireless device to the first device, wherein the first device is configured to:
receive the message from the wireless device;
use the message from the wireless device to obtain the second time value that is based on when operating power was applied to the wireless device;
determine the correlation among the first time value that is based on when operating power was applied to the first device and the second time value that is based on when operating power was applied to the wireless device; and
in response to determining the correlation among the first time value that is based on when operating power was applied to the first device and the second time value that is based on when operating power was applied to the wireless device, send, to the wireless device, the provisioning information configured to facilitate access by the wireless device to the service via the wireless network.

30. The wireless device of claim 28, wherein the processor is configured with processor-executable instructions to perform operations further comprising:
receiving a message from the first device;
using the message from the first device to obtain the first time value that is based on when operating power was applied to the first device;
determining the correlation among the first time value that is based on when operating power was applied to the first device and the second time value that is based on when operating power was applied to the wireless device; and
sending, to the first device, an indication of the correlation among the first time value that is based on when operating power was applied to the first device and the second time value that is based on when operating power was applied to the wireless device, wherein the first device is configured to:
a) receive, from the wireless device, the indication of the correlation among the first time value that is based on when operating power was applied to the first device and the second time value that is based on when operating power was applied to the wireless device; and
b) in response to receiving, from the wireless device, the indication of the correlation among the first time value that is based on when operating power was applied to the first device and the second time value that is based on when operating power was applied to the wireless device, send, to the wireless device, the provisioning information configured to facilitate access by the wireless device to the service via the wireless network.

31. The wireless device of claim 28, wherein the provisioning information, which is sent to the wireless device in response to the correlation among the first time value that is based on when operating power was applied to the first device and the second time value that is based on when operating power was applied to the wireless device, includes at least one of a credential for the wireless network, a credential for the service, or a cryptographic key.

* * * * *